United States Patent [19]

Boghean et al.

[11] Patent Number: 4,929,435
[45] Date of Patent: May 29, 1990

[54] MANUFACTURE OF HIGH PURITY LOW ARSENIC ANHYDROUS HYDROGEN FLUORIDE

[75] Inventors: Barry J. Boghean, St. Clair Beach, Canada; Somanahalli N. Subbanna, East Amherst, N.Y.; Charles L. Redmon, Hamburg, N.Y.; Christian A. Wamser, Camillus, N.Y.

[73] Assignee: Allied-Signal Inc., Morris Township, Morris County, N.J.

[21] Appl. No.: 217,497

[22] Filed: Jul. 11, 1988

Related U.S. Application Data

[63] Continuation-in-part of Ser. No. 14,422, Feb. 12, 1987, Pat. No. 4,756,899.

[51] Int. Cl.$^5$ .............................. C01B 7/19; B01D 3/34
[52] U.S. Cl. ........................................ 423/484; 203/31
[58] Field of Search ........................... 423/484; 203/31

[56] References Cited

U.S. PATENT DOCUMENTS

| | | | |
|---|---|---|---|
| 3,166,379 | 1/1965 | Bradley et al. | 423/484 |
| 3,663,382 | 5/1972 | Garris | 203/91 |
| 3,687,622 | 8/1972 | Garris | 423/488 |
| 3,689,370 | 9/1972 | Ouaha | 423/488 |
| 4,032,621 | 6/1977 | Meadows | 423/484 |
| 4,083,941 | 4/1978 | Jayawant et al. | 423/488 |
| 4,491,570 | 1/1985 | Wheaton et al. | 423/483 |
| 4,752,379 | 6/1988 | Delaney | 208/291 |
| 4,752,380 | 6/1988 | Delaney | 208/252 |
| 4,756,899 | 7/1988 | Jenczewski et al. | 423/488 |

FOREIGN PATENT DOCUMENTS

| | | |
|---|---|---|
| 0027607 | 4/1981 | European Pat. Off. . |
| 0062309 | 6/1968 | Fed. Rep. of Germany . |
| 1335675 | 7/1962 | France . |
| 39-5606 | 6/1964 | Japan .................................. 423/484 |
| 054463 | 10/1978 | Japan .................................. 423/484 |
| 0151002 | 7/1986 | Japan . |

*Primary Examiner*—Jeffrey E. Russel
*Assistant Examiner*—Stephen G. Kalinchak
*Attorney, Agent, or Firm*—Melanie L. Brown; Jay P. Friedenson

[57] ABSTRACT

A process for manufacturing high purity anhydrous hydrogen fluoride (HF) having low levels of arsenic impurity by contacting anhydrous hydrogen fluoride product, or an intermediate product obtained during the manufacture of HF, with hydrogen peroxide to oxidize the arsenic impurity in the presence of a catalyst which comprises a catalytic amount of a component selected from the group consisting of molybdenum, a molybdenum compound, vanadium, and a vanadium compound, and a phosphate compound. The volatile trivalent arsenic impurity in the anhydrous hydrogen fluoride is oxidized to a non-volatile pentavalent arsenic compound and the resultant mixture is distilled to recover high purity anhydrous hydrogen fluoride with reduced levels of arsenic impurity. In one embodiment, an oxidizing agent such as nitric acid or a nitrate salt is added to the reaction mixture to oxidize organic compounds.

20 Claims, No Drawings

MANUFACTURE OF HIGH PURITY LOW ARSENIC ANHYDROUS HYDROGEN FLUORIDE

CROSS-REFERENCE TO RELATED APPLICATION

This application is a continuation-in-part application of copending patent application Ser. No. 014,422 filed Feb. 12, 1987, now U.S. Pat. No. 4,756,899.

FIELD OF THE INVENTION

This invention relates to the manufacture of high purity anhydrous hydrogen fluoride (HF) with low levels of arsenic impurity. More specifically, this invention deals with a manufacturing process which consists of contacting industrial grade anhydrous hydrogen fluoride, or an intermediate product obtained during the hydrogen fluoride manufacturing process, with hydrogen peroxide to oxidize the arsenic impurity in the presence of a catalyst which comprises a catalytic amount of a component selected from the group consisting of molybdenum, a molybendum compound, vanadium and a vanadium compound and a phosphate compound to oxidize volatile trivalent arsenic impurity to non-volatile pentavalent arsenic compounds and distilling the resultant mixture to recover high purity anhydrous hydrogen fluoride. The thus recovered HF has low levels of arsenic impurity.

BACKGROUND OF THE INVENTION

A method generally employed in the manufacture of hydrogen fluoride involves heating a mixture of fluorspar and sulfuric acid in a rotation furnace. The crude hydrogen fluoride gases leaving the furnace are scrubbed to remove entrained solids, cooled, and condensed to form an initial crude product. The initial crude product formed which comprises at least 95 percent by weight of HF contains various undesirable impurities and these are removed by fractional distillation to give technical or industrial grade anhydrous hydrogen fluoride which has a purity of 99.95% HF or better. The industrial grade anhydrous hydrogen fluoride thus obtained still contains large quantities of undesirable impurities such as arsenic. The amount of arsenic impurity which is present in industrial grade anhydrous hydrogen fluoride depends on the arsenic impurity in the fluorspar from which anhydrous hydrogen fluoride is produced. The industrial grade anhydrous hydrogen fluoride generally contains about 50-500 ppm of arsenic impurity. The presence of arsenic impurity in anhydrous hydrogen fluoride at these levels is highly undesirable for many applications. Anhydrous hydrogen fluoride is used in the refining and chemical manufacturing industries and arsenic impurities in anhydrous hydrogen fluoride can poison the catalyst and contaminate the manufactured product which adversely affects the product quality. In the electronics industry, aqueous solutions of hydrogen fluoride are used as cleaning agents and etchants in the manufacture of semiconductors diodes, and transistors. A high degree of purity and very low levels of arsenic in anhydrous hydrogen fluoride are required to prevent minute quantities of arsenic impurity from remaining on the surfaces of said electronic industry products after they have been cleaned or etched with hydrogen fluoride.

Several processes have been proposed to remove arsenic from industrial grade anhydrous hydrogen fluoride. Among these are processes which involve multiple fractional distillation in fluoroplastic equipment. However such methods are suitable only for the preparation of small quantities of high purity anhydrous hydrogen fluoride and are not considered to be economical for producing commercial quantities.

U.S. Pat. No. 3,166,379 discloses a method whereby high purity aqueous hydrogen fluoride is produced by treatment with an oxidizing agent such as permanganate or chromate or with an oxidizing agent and a halogen, preferably iodine, to convert arsenic impurity to a nonvolatile compound. This process is suitable for the purification of aqueous hydrofluoric acid but suffers from the drawback of contamination with manganese and chromium compounds when anhydrous hydrogen fluoride is distilled.

A solution to the above problem is claimed in U.S. Pat. No. 3,689,370 which describes a process involving the addition of an inorganic ferrous salt to anhydrous hydrogen fluoride after the permanganate or chromate treatment to reduce excess oxidizing agent. However, this process also results in a high level of iron contamination in the final product.

The iron contamination problem is solved in U.S. Pat. No. 4,032,621 which describes a process involving the addition of a heavy metal free reagent such as hydrogen peroxide to anhydrous hydrogen fluoride after the permanganate or chromate treatment to reduce excess oxidizing agent. This process is very sensitive and may not be convenient for continuous operation.

In the systems of the above patents, arsenic is removed from aqueous hydrofluoric acid using aqueous permanganate solutions. However, because of the corrosion problem in aqueous systems, a system of that kind is undesirable. The process control of continuous operation in such systems would also present problems. The addition of water could be overcome by addition of solid potassium permanganate to anhydrous hydrogen fluoride for arsenic removal. But this process is associated with a potential explosion hazard problem during plant operation.

W. Roland et al., in East German Patent No. 62,309 (June 20, 1968), claim removal of arsenic from 80-90% aqueous HF with 30% $H_2O_2$ at 40°-60° C. They also claim that arsenic removal from anhydrous hydrogen fluoride could be accomplished by continuously adding anhydrous hydrogen fluoride and hydrogen peroxide solution of suitable concentration to the reactor maintained at 80-90% HF and 40° to 60° C. The reactor contents are distilled and absorbed in water to produce purified aqueous solution of HF product. This process is limited to production of aqueous solution of HF product and is unsuitable for manufacture of purified anhydrous hydrogen fluoride.

U.S. Pat. No. 4,083,941 claims removal of arsenic and sulfate from anhydrous hydrogen fluoride with the addition of 0.7% $H_2O_2$ and 0.6% methanol at 0°-75° C. But this has the disadvantage of introducing a foreign material to the process.

U.S. Pat. No. 4,491,570 claims arsenic removal from anhydrous hydrogen fluoride by treating with hydrogen chloride or a fluoride salt or both and then separating purified anhydrous hydrogen fluoride by distillation from the non-volatile arsenic compounds. Again, this process has the potential of introducing a foreign material into purified anhydrous hydrogen fluoride.

U.S. Pat. No. 3,687,622 describes a high pressure distillation process at a pressure of 115 psia or above to produce low arsenic anhydrous hydrogen fluoride. The main drawback of this process is the very high pressure required for the distillation.

In all of these prior art processes for arsenic removal, there is danger of introducing a foreign material to purified anhydrous hydrogen fluoride. A need, therefore, exists for a simple and economical process for arsenic removal on a continuous basis which does not introduce any appreciable quantities of foreign material to purified anhydrous hydrogen fluoride and which is safe from explosion hazards.

SUMMARY OF THE INVENTION

In accordance with this invention, a process for manufacturing high purity anhydrous hydrogen fluoride with low levels of arsenic impurity is provided which does not introduce foreign material into the final product and which is adapted for continuous operation. The process involves contacting industrial grade anhydrous hydrogen fluoride, or an intermediate product obtained in the manufacturing process. With an effective amount of hydrogen peroxide to oxidize the arsenic impurity in the presence of a catalyst which comprises a catalytic amount of (i) a component selected from the group consisting of molybdenum, a molybdenum compound, vanadium, and a vanadium compound and (ii) a phosphate compound at a temperature and for a period of time sufficient to oxidize the volatile trivalent arsenic impurities in the anhydrous hydrogen fluoride to non-volatile pentavalent arsenic compounds and distilling the resulting mixture and recovering high purity anhydrous hydrogen fluoride with reduced levels of arsenic impurity. The presence of organic contaminants in the hydrogen fluoride has been found to interfere with the hydrogen peroxide oxidation of the arsenic impurities. In this case, it has been found that such interference can be avoided by carrying out the reaction in the presence of an oxidizing agent for the organic contaminants, such as nitric acid, or a salt thereof.

DETAILED DESCRIPTION OF THE PREFERRED EMBODIMENTS

In practice of the invention, hydrogen peroxide oxidizing agent, and a catalyst, chosen according to the invention, are fed individually or in admixture to an arsenic removal reactor. Industrial grade anhydrous hydrogen fluoride, or an intermediate product obtained in the manufacture of anhydrous hydrogen fluoride, containing high levels of arsenic impurity, is fed continuously to the arsenic removal reactor. In the arsenic removal reactor, the volatile trivalent arsenic impurity is oxidized to a non-volatile pentavalent arsenic compound. The reaction products from the arsenic removal reactor are then ted to a continuous distillation column. The high purity anhydrous hydrogen fluoride containing reduced levels of arsenic impurity is drawn from the top of the distillation column as a product. The waste stream containing high levels of arsenic impurity is drawn from the bottom of the distillation column. The waste stream is further treated to recover volatile HF. The non-volatile arsenic impurity is separated and discarded in a suitable manner.

In the process of this invention, substantially all arsenic impurities, whether present in low or high concentrations, are removed from the anhydrous hydrogen fluoride. Reference herein to "anhydrous hydrogen fluoride" means hydrogen fluoride that is at least 95% and preferably at least 99.9% by weight hydrogen fluoride.

The hydrogen peroxide reagent oxidizes volatile trivalent arsenic impurities to non-volatile pentavalent arsenic compounds according to the following reaction:

$$As^{+3} + H_2O_2 + 2H^+ \rightarrow As^{+5} + 2H_2O$$

It forms only water as by-product of reaction. The stoichiometric amount of hydrogen peroxide required by the above reaction is not enough to convert all the trivalent arsenic impurity to pentavalent arsenic. A large excess, preferably a minimum of about 3 times the stoichiometric amount, is preferred in order to achieve a substantial conversion with reasonable reaction time. The excess hydrogen peroxide not used up in the above reaction decomposes to form $H_2O$ and $O_2$.

$$H_2O_2 \rightarrow H_2O + \tfrac{1}{2} O_2$$

It has been found that hydrogen peroxide is completely or substantially decomposed at the end of the reaction and therefore does not contaminate the final product. Any commercially available hydrogen peroxide may be used in the process of this invention and may be of reagent grade or commercial grades. Additionally, the peroxide may be a by-product of other chemical manufacture. Hydrogen peroxide of up to 70% by weight which is commercially available may be used, although any peroxide of other concentrations may be used in the process of this invention. It is preferable to use 50–70% by weight hydrogen peroxide in water because it introduces minimum quantities of water to the process.

There are various grades of hydrogen peroxide commercially available and the difference between reagent grade and commercial grade hydrogen peroxide is important for the process of this invention. The reagent grade hydrogen peroxide is a pure compound which has very little stabilizer added to it. On the other hand, the commercial grade hydrogen peroxide contains substantial quantities of stabilizers added to it. The commonly used stabilizers in commercial grade hydrogen peroxide are sodium stannate and phosphates or phosphate containing compounds. Therefore, when a commercial grade of hydrogen peroxide which contains phosphate stabilizers is used in the process of this invention, there may be no need to add the phosphate component of the catalyst separately.

The amount of hydrogen peroxide preferred to be used in the process of the invention is in the range of about 0.1 to about 1.5%, and more preferably, about 0.1 to about 0.55% based on the weight of anhydrous HF.

The upper limit of hydrogen peroxide that may be used in the process of this invention is limited only by economics, convenience, and equipment corrosion problems. The effective amount of hydrogen peroxide used in the process of this invention depends to a significant extent on the amount of arsenic impurity present in the original hydrogen fluoride and may depend also on the arsenic impurity level required in the final anhydrous hydrogen fluoride product.

The process of the invention requires a catalyst to achieve satisfactory results. The catalyst increases the reaction rate and thereby decreases the reaction time and temperature required for completion of reaction and also decreases the amount of hydrogen peroxide required for arsenic removal. The catalyst also results in an increase in the rate at which the volatile arsenic impurities are converted to non-volatile arsenic compounds.

We have discovered that a suitable catalyst comprises molybdenum, a molybdenum compound, vanadium or a vanadium compound, and a phosphate compound.

A molybdenum component may be molybdenum metal, an organic molybdenum compound such as molybdenum acetyl acetonate or $MoO_2[CH_3COCHCOCH_3]_3$ or an inorganic molybdenum compound such as a mono- or poly-alkali metal molybdate, a molybdenum oxide, or a mono- or poly-ammonium molybdate. The preferred molybdenum component is ammonium molybdate or $(NH_4)_6 Mo_7O_{24} \cdot 4H_2O$.

A vanadium component may be vanadium metal, an organic vanadium compound such as vanadyl acetate or $VO[OOCCH_3]_2$, or an inorganic vanadium compound such as a mono- or poly-alkali metal vanadate, a vanadium oxide. or a mono- or poly-ammonium vanadate. The preferred vanadium components are sodium metavanadate or $NaVO_3$, sodium orthovanadate or $Na_3VO_4$, and ammonium vanadate or $NH_4VO_3$.

Suitable phosphate components include phosphoric acid and the inorganic phosphates such as mono- and poly-alkali metal phosphates and the mono- and poly-ammonium phosphates. The preferred phosphate component is sodium pyrophosphate, $Na_4P_2O_7 10H_2O$.

The amount of catalyst required in the process of the invention, including the proportion of components, is that amount and that proportion which is effective to achieve a satisfactory rate at which the volatile arsenic impurities are converted to non-volatile arsenic compounds. Such amount and proportion will vary with the objective of the operator and the particular components chosen and can be readily ascertained by persons skilled in the art.

Generally, at least about 3.7 ppm (based on 100% hydrogen fluoride) of the metal component is required and at least about 3.5 ppm of the phosphate component is required. However, when the minimum amount of one of the catalyst components is employed, the other component should preferably be present in at least 3–4 times the minimum amount. The preferred amount of the metal component is from about 10–65 ppm. The preferred amount of the phosphate component is from about 25–400 ppm, preferably from about 100–400 ppm for phosphoric acid and, still preferably, from about 10–55 ppm for sodium pyrophosphate. High quantities of each catalyst component can be used in the process of the invention, although such may not be economical or convenient.

The process of the present invention is preferably carried out at a temperature in the range of about 15°–75° C. Below about 15° C., the reaction generally slows to an impractical rate. The reaction rate increases as temperature increases. The reaction could be carried out at temperatures higher than about 75° C. but it is not economical because it requires unnecessarily very high pressure equipment. The most preferred temperature range or the process of this invention is 50°–65° C. The boiling point of hydrogen fluoride is 19.54° C. If the reaction is to be carried out at temperatures greater than 19.54° C., pressure equipment is required to keep hydrogen fluoride liquid and to carry out the reaction in the liquid phase. The normal pressure required to keep hydrogen fluoride in liquid phase at about 57° C. is about 3.4 atmospheres.

It has been found that organic contaminants in the hydrogen fluoride can interfere with the catalytic arsenic removal process described herein. Sources for such organic contaminants include greases from pumps which are used to transfer the hydrogen fluoride and the raw materials from which the hydrogen fluoride is prepared. In one embodiment of the invention therefore, hydrogen fluoride is employed which is free of an amount of organic contaminants which would interfere with the hydrogen peroxide oxidation of the arsenic impurities. We have ascertained that as little as 100 ppm of organic contaminants in the reaction mixture can interfere with the hydrogen peroxide oxidation of the arsenic impurities, but we have not established the threshold limit. In practice, however, if the oxidation reaction of the arsenic impurities with hydrogen peroxide does not proceed efficiently, it can be presumed that there is present an interfering amount of an organic contaminant in which case the following embodiment of the invention can be practiced.

When an interfering amount of such organic contaminants is present it has been found that such interference with the catalytic arsenic removal process can be avoided or minimized by adding an effective amount of an oxidizing agent for the organic contaminants. The oxidizing agent chosen should be one which is effective to oxidize the organic contaminants present, but which does not interfere with the hydrogen peroxide oxidation of the arsenic impurities.

Suitable oxidizing agents for the organic contaminants include nitric acid and nitric acid salts, such as alkali metal salts and the ammonium salt. The preferred salt is sodium nitrate. Other suitable oxidizing agents will be apparent to persons skilled in the art, or may be ascertained by routine testing.

The point of addition of the oxidizing agent for the organic contaminant is not critical, but is preferably added to the hydrogen fluoride stream prior to addition of the catalyst.

The amount of the oxidizing agent for the organic contaminant to be used is dependent upon the nature and amount of the organic contaminants present. Generally, about 2–10 parts of the oxidizing agent per 100 parts of organic should be used, and preferably, 5–10 parts of oxidizing agent per 100 parts of organic. The optimum amount of a given oxidizing agent to use with a given hydrogen fluoride material can readily be determined by persons skilled in the art by routine experimentation.

The reaction time required for completion of the process of this invention varies over a wide range. The reaction can be carried out in as little as 2 minutes or less, but is usually carried out at a residence time greater than 3 minutes. The preferred residence time used for the process of this invention is 30–60 minutes. Although the reaction could be carried out at any residence time greater than 60 minutes, it would be unnecessary and economically unattractive to do so.

The process of this invention must be conducted in equipment which is not attacked by anhydrous hydrogen fluoride so as to preclude contamination by extraneous material from the reaction equipment. Accordingly, all surfaces of the reactor, distillation column, column packing, condenser and receiver which come into contact with hydrogen fluoride must be inert to HF. Suitable materials of construction are metals such as low carbon steel, stainless steel, nickel, nickel alloys, and platinum. Of these, low carbon steel is preferred from the standpoint of economy. Polymeric materials such as polyethylene, polyvinyl chloride, and fluorocarbon polymers available commercially may be used. The fluorocarbon polymers are preferred.

The arsenic impurities are converted to non-volatile arsenic compounds or residues with low volatility compared to hydrogen fluoride. Therefore, elaborate fractionation is not necessary to separate the non-volatile arsenic compounds from the hydrogen fluoride. Thus, distillation at atmospheric pressure can be used to separate the non-volatile arsenic impurities and to make high purity anhydrous hydrogen fluoride with low levels of arsenic impurity.

While the invention is directed primarily to production of high purity anhydrous hydrogen fluoride containing low values of arsenic impurity, it may also be used for production of high purity anhydrous hydrogen fluoride for critical uses such as those required by the electronic industry.

The invention will be further described by reference to the following Examples. References to percentages and parts are by weight based on 100% HF unless otherwise indicated. In the Tables, RG refers to reagent grade $H_2O_2$, CG refers to commercial grade $H_2O_2$, TG refers to technical grade $H_2O_2$, and DG refers to dilution grade $H_2O_2$. Also, in these Examples, reference is made to the intermediate product which is obtained during the process of manufacturing industrial grade anhydrous hydrogen fluoride. The intermediate product is anhydrous hydrogen fluoride obtained from the reboiler outlet of the first distillation column in a two column purification system for industrial grade anhydrous hydrogen fluoride. Standard analytical methods were employed for hydrogen peroxide and arsenic analyses. Hydrogen peroxide analyses were made by standardized thiosulfate titration of liberated iodine. Arsenic analyses were made by absorption of arsine by silver diethyldithiocarbamate in pyridine and spectrophotometric comparison to a standard.

The equipment used in the laboratory studies consists of a cylindrical mild steel or Teflon(registered trademark) coated reactor of about 800 cc. capacity. The reactor is jacketed for circulation of hot and cold water for temperature control.

The laboratory experiments were conducted using either industrial grade anhydrous hydrogen fluoride or an intermediate product obtained in the manufacture of anhydrous hydrogen fluoride. The initial value of arsenic impurity in these products before the reaction was in the range of 500–900 ppm of arsenic as As metal. In general after completion of laboratory experiments we did not distill the final reacted reaction mixture to obtain high purity anhydrous hydrogen fluoride. However, in actual commercial practice, the reaction mixture will be distilled to obtain high purity anhydrous hydrogen fluoride product. Instead of analyzing the distilled high purity anhydrous hydrogen fluoride product for $As^{+3}$, we analyzed the final reacted reaction mixture for $As^{+3}$. We have found that $As^{+3}$ that would be present in distilled high purity anhydrous hydrogen fluoride is less than or equal to $As^{+3}$ present in final reacted reaction mixture.

The following Examples 1 through 4 illustrate that hydrogen peroxide oxidizing agent alone (without catalyst), while removing arsenic, does not remove sufficient amounts thereof.

EXAMPLE 1

Attempt was made to remove arsenic impurity from industrial grade anhydrous hydrogen fluoride by using a 30% reagent grade hydrogen peroxide in the laboratory reactor described above. The anhydrous hydrogen fluoride initially contained arsenic impurity in the range of 500–800 ppm $As^{+3}$. The reactor Was charged with 400 grams of anhydrous hydrogen fluoride and 6.7 ml of 30% reagent grade hydrogen peroxide and allowed to react at about 57° C. for a period of 45 minutes. The hydrogen peroxide was not completely decomposed at the end of the reaction. The reaction mixture obtained at the end of the reaction contained 620 ppm of $As^{+3}$. The results are given in Table 1.

EXAMPLE 2

Attempt was made to remove arsenic impurity from industrial grade anhydrous hydrogen fluoride by using 50% commercial grade hydrogen peroxide in the laboratory reactor described above. The anhydrous hydrogen fluoride initially contained arsenic impurity in the range of 500–800 ppm $As^{+3}$. The reactor was charged with 398 grams of anhydrous hydrogen fluoride and 8.4 ml of 50% commercial grade hydrogen peroxide and allowed to react at about 57° C. for a period of 45 minutes. The hydrogen peroxide was completely decomposed at the end of the reaction. The final reaction mixture after the reaction contained 265 ppm of $As^{+3}$. The results are given in Table 1 below.

EXAMPLE 3

Attempt was made to remove arsenic impurity from an intermediate product by using 30% reagent grade hydrogen peroxide in the laboratory reactor described above. The intermediate product initially contained arsenic impurity in the range of 500–800 ppm $As^{+3}$. The reactor was charged with 400 grams of intermediate product and 6.7 ml of 30% reagent grade hydrogen peroxide. The reactants were allowed to react at about 57° C. for a period of 45 minutes. The hydrogen peroxide was not completely decomposed at the end of the reaction. The final reaction mixture obtained after the reaction contained 470 ppm of $AS^{+3}$. The results are given in Table 1 below.

EXAMPLE 4

Attempt was made to remove arsenic impurity from an intermediate product by using 50% commercial grade hydrogen peroxide in the laboratory reactor described above. The intermediate product initially contained arsenic impurity in the range of 500–800 ppm $As^{+3}$. The reactor was charged with 387 grams of anhydrous hydrogen fluoride and 8.7 ml of 50% commercial grade hydrogen peroxide. The reactants were allowed to react at about 57° C. for a period of 45 minutes. The hydrogen peroxide was completely decomposed at the end of the reaction. The reaction mixture obtained after the reaction contained 265 ppm of $As^{+3}$. The results are given in Table 1 which follows.

TABLE 1

| Ex. No. | HF Source | $H_2O_2$ Type | $H_2O_2$ Initial % | $H_2O_2$ Final % | $As^{+3}$ Final (ppm) |
|---|---|---|---|---|---|
| 1 | Ind. AHF | 30% RG | 0.5 | 0.54 | 620 |
| 2 | Ind. AHF | 50% CG | 1.1 | 0.03 | 265 |

TABLE 1-continued

| Ex. No. | HF Source | $H_2O_2$ Type | $H_2O_2$ Initial % | $H_2O_2$ Final % | $As^{+3}$ Final (ppm) |
|---|---|---|---|---|---|
| 3 | Int. Prod. | 30% RG | 0.5 | 0.41 | 470 |
| 4 | Int. Prod. | 50% CG | 1.1 | <0.01 | 265 |

The results shown in Table 1 above indicate that there is insufficient arsenic removal from anhydrous hydrogen fluoride by using hydrogen peroxide oxidizing agent alone (without catalyst) within a reasonable residence time.

Examples 5–6 illustrate that arsenic impurity is not removed satisfactorily from anhydrous hydrogen fluoride by using hydrogen peroxide in the presence of just one of the claimed catalyst components.

EXAMPLE 5

In this example, an attempt was made to remove arsenic impurity from an intermediate product by using 30% reagent grade hydrogen peroxide and ammonium molybdate as a catalyst in the laboratory reactor described above. The intermediate product initially contained arsenic impurity in the range of 500–800 ppm $As^{3+}$. The reactor was charged with 419 grams of intermediate product, 7.0 ml of 30% reagent grade hydrogen peroxide (i.e., containing little or no phosphate stabilizer), and 15.5 mg of ammonium molybdate. The reactants were allowed to react at about 57° C. for a period of 30 minutes. The hydrogen peroxide was not completely decomposed at the end of the reaction. The final reaction mixture after the reaction contained 640 ppm of $As^{3+}$. The results are given in Table 2 below.

EXAMPLE 6

In this example, an attempt was made to remove arsenic impurity from an intermediate product by using 30% reagent grade hydrogen peroxide (i.e.. containing little or no phosphate stabilizer) and sodium pyrophosphate as a catalyst in the laboratory reactor described above. The intermediate product initially contained arsenic impurity in the range of 500–800ppm $As^{+3}$. The reactor was charged with 450 grams of intermediate product, 7.5 ml of 30% reagent grade hydrogen peroxide, and 23.0 mg of sodium pyrophosphate. The reactants were allowed to react at about 57° C. for a period of 45 minutes. The hydrogen peroxide was almost completely decomposed at the end of the reaction. The final reaction mixture after the reaction contained 640 ppm $As^{+3}$. The results are given in Table 2 below. SP stands for sodium pyrophosphate.

Examples 7–9 illustrate that arsenic impurity is removed satisfactorily from anhydrous hydrogen fluoride by using hydrogen peroxide in the presence of the catalyst mixture according to this invention.

EXAMPLE 7

In this example, an attempt was made to remove arsenic impurity from an intermediate product by using 30% reagent grade hydrogen peroxide and ammonium molybdate and sodium pyrophosphate as catalysts in laboratory reactor described above. The intermediate product initially contained arsenic impurity in the range of 500–800 ppm $As^{+3}$. The reactor was charged with 400 grams of intermediate product. 6.7 ml of 30% reagent grade hydrogen peroxide, 14.7 mg of ammonium molybdate, and 20.5 mg of sodium pyrophosphate. The reactants were allowed to react at about 57° C. for a period of 45 minutes. The hydrogen peroxide was completely decomposed at the end of the reaction. The final reaction mixture after the reaction contained less than 5 ppm of $As^{+3}$. The results are given in Table 2 below.

EXAMPLE 8

In this example, the effort was made to remove arsenic impurity from an intermediate product by using 50% commercial grade hydrogen peroxide (i.e., containing a phosphate stabilizer) and ammonium molybdate as catalyst in the laboratory reactor described above. The intermediate product initially contained arsenic impurity in the range of 500–800 ppm $As^{+3}$. The reactor was charged with 399 grams of intermediate product, 4.0 ml of 50% commercial grade hydrogen peroxide, and 18.4 mg of ammonium molybdate as catalyst. The reactants were allowed to react at about 57° C. for a period of 30 minutes. The hydrogen peroxide at the end of the reaction was completely decomposed. The final reaction mixture after the reaction contained less than 5 ppm $As^{+3}$. The results are given in Table 2 below.

EXAMPLE 9

In this example an effort was made to remove arsenic impurity from industrial grade anhydrous hydrogen fluoride by using 50% reagent grade hydrogen peroxide and ammonium molybdate and sodium pyrophosphate as catalysts in laboratory reactor described above. The industrial grade anhydrous hydrogen fluoride initially contained arsenic impurity in the range of 500–800 ppm $As^{+3}$. The reactor was charged with 398 grams of anhydrous hydrogen fluoride, 4.0 ml of 50% reagent grade peroxide, 7.3 mg of ammonium molybdate, and 10.2 mg of sodium pyrophosphate. The reactants were allowed to react at about 57° C. for a period of 45 minutes. Hydrogen peroxide was almost completely decomposed at the end of the reaction. The final reaction mixture after the reaction contained less than 5 ppm of $As^{+3}$. The results are given in Table 2 below.

TABLE 2

| Ex. No. | HF Source | $H_2O_2$ Type | Catalyst $H_2O_2$ Initial % | Mo (ppm) | SP (ppm) | $H_2O_2$ Final % | Final $As^{+3}$ (ppm) |
|---|---|---|---|---|---|---|---|
| 5 | Int. Prod. | 30% RG | 0.5 | 37 | 0 | 0.28 | 640 |
| 6 | Int. Prod. | 30% RG | 0.5 | 0 | 51 | 0.01 | 640 |
| 7 | Int. Prod. | 30% RG | 0.5 | 37 | 51 | <0.01 | <5 |
| 8 | Int. Prod. | 50% CG | 0.5 | 46 | 0 | <0.01 | <5 |
| 9 | Ind. | 50% | 0.5 | 18 | 26 | 0.01 | <5 |

TABLE 2-continued

| Ex. No. | HF Source | $H_2O_2$ Type | Catalyst | | | | Final $As^{+3}$ (ppm) |
|---|---|---|---|---|---|---|---|
| | | | $H_2O_2$ Initial % | Mo (ppm) | SP (ppm) | $H_2O_2$ Final % | |
| | AHF | RG | | | | | |

The above results indicate that in conjunction with reagent grade hydrogen peroxide which has very little stabilizers added to it that ammonium molybdate alone is not a catalyst for the process of this invention (Example 5). Sodium pyrophosphate alone is not a catalyst for the process of this invention (Example 6). Ammonium molybdate and sodium pyrophosphate (or a polyphosphate) together act as catalyst for the process of this invention (Example 7). In Example 8, ammonium molybdate alone appears to be acting as a catalyst when it is used with commercial grade hydrogen peroxide because commercial grade hydrogen peroxide contains phosphates as stabilizer and supplies the desired catalyst for the process of this reaction.

In Example 9, it is shown that the process of this invention applies not only to an intermediate product but also to industrial grade anhydrous hydrogen fluoride and that ammonium molybdate and sodium pyrophosphate together act as a catalyst.

Examples 10, 11 and 12 illustrate that molybdenum metal and various molybdenum compounds together with polyphosphates act as a catalyst for the process or this invention.

EXAMPLE 10

In this example, an attempt was made to remove arsenic impurity from industrial grade anhydrous hydrogen fluoride by using 30% reagent grade $H_2O_2$ and sodium molybdate, $Na_2MoO_4$, and sodium pyrophosphate as catalyst in the laboratory reactor described above. The industrial grade anhydrous hydrogen fluoride initially contained arsenic impurity in the range of 500–800 ppm of $As^{+3}$. The reactor was charged with 400 gm of industrial grade anhydrous hydrogen fluoride. 6.7 ml of 30% reagent grade $H_2O_2$, 20.2 mg of sodium molybdate, and 20.5 mg of sodium pyrophosphate. The reactants were allowed to react at about 57° C. for a period of 35 minutes. At the end of the reaction, $H_2O_2$ was completely decomposed. The final reaction mixture after the reaction contained less than 5 ppm of $As^{+3}$. The results are given in Table 3 below. SP stands for sodium pyrophosphate.

EXAMPLE 11

In this example, an effort was made to remove arsenic impurity from industrial grade anhydrous hydrogen fluoride (AHF) by using 30% reagent grade $H_2O_2$ and molybdenum trioxide $MoO_3$ and sodium pyrophosphate as catalyst in laboratory reactor described above. The industrial grade AHF initially contained arsenic impurity in the range of 500–800 ppm $As^{+3}$. The reactor was charged with 400 gm of industrial grade AHF, 6.7 ml of 30% reagent grade $H_2O_2$, 30.0 mg of $MoO_3$, and 20.5 mg of sodium pyrophosphate. The reactants were allowed to react at about 57° C. for a period of 30 minutes. At the end of the reaction. $H_2O_2$ was completely decomposed. The final reaction mixture after the reaction contained less than 5 ppm of $As^{+3}$. The results are given in Table 3 below.

EXAMPLE 12

In this example an attempt was made to remove arsenic impurity from industrial grade anhydrous hydrogen fluoride by using 30% reagent grade $H_2O_2$ and molybdenum metal and sodium pyrophosphate as catalyst in equipment described above. The industrial grade AHF initially contained arsenic impurity in the range of 500–800 ppm $As^{+3}$. The reactor was charged with 400 gm of industrial grade AHF, 6.7 ml of 30% reagent grade $H_2O_2$, 500 mg of molybdenum metal, and 20.5 mg of sodium pyrophosphate. The reactants were allowed to react at about 57° C. for a period of 30 minutes. At the end of the reaction, $H_2O_2$ was completely decomposed. The final reaction mixture after the reaction contained less than 5 ppm of $As^{+3}$. The results are given in Table 3 below.

TABLE 3

| Ex. No. | HF Source | $H_2O_2$ Type | Catalyst | | | | Final $As^{+3}$ (ppm) |
|---|---|---|---|---|---|---|---|
| | | | $H_2O_2$ Initial % | Mo (ppm) | SP (ppm) | $H_2O_2$ Final % | |
| 10 | Ind AHF | 30% RG | 0.5 | 50 $Na_2MoO_4$ | 51 | <0.01 | <5 |
| 11 | Ind AHF | 30% RG | 0.5 | 75 $MoO_3$ | 51 | <0.01 | <5 |
| 12 | Ind AHF | 30% RG | 0.5 | 1250 Mo metal | 51 | <0.01 | <5 |

The results in the above table show molybdenum metal and various compounds of molybdenum together with polyphosphates act as catalyst for the process of this invention.

Examples 13 and 14 illustrate that arsenic impurity is removed from anhydrous hydrogen fluoride in the process of this invention by using hydrogen peroxide as an oxidizing agent in the presence of ammonium molybdate and monophosphate as a catalyst.

EXAMPLE 13

In this example the attempt was made to remove arsenic impurity from an intermediate product by using 30% reagent grade hydrogen peroxide and ammonium molybdate and phosphoric acid as a catalyst in the laboratory reactor described above. The intermediate product initially contained arsenic impurity in the range of 500–800 ppm $As^{+3}$. The reactor was charged with 400 grams of intermediate product, 6.7 ml of 30% reagent grade hydrogen peroxide, 20.5 mg of ammonium molybdate, and 160 mg of phosphoric acid. The reactants were allowed to react at about 57° C. for a period of 30 minutes. At the end of the reaction, hydrogen peroxide was completely decomposed, The final reaction mixture after the reaction contained less than 5 ppm $As^{+3}$. The results are given in Table 4 below. PA stands for phosphoric Acid.

EXAMPLE 14

In this example, the effort was made to remove arsenic impurity from an intermediate product by using 30% reagent grade hydrogen peroxide and ammonium molybdate and phosphoric acid as a catalyst in the laboratory reactor described above. The intermediate product initially contained arsenic impurity in the range of 500-800 ppm $As^{+3}$. The reactor was charged with 700 grams of intermediate product, 7.2 ml of 30% reagent grade peroxide, 18.0 mg of ammonium molybdate, and 115 mg of phosphoric acid. The reactants were allowed to react at about 57° C. for a period of 45 minutes. At the end of the reaction, hydrogen peroxide was completely decomposed. The final reaction mixture after the reaction contained less than 5 ppm $As^{+3}$. The results are given in Table 4 below.

TABLE 4

| Ex. No. | HF Source | $H_2O_2$ Type | Catalyst $H_2O_2$ Initial % | Mo (ppm) | PA (ppm) | $H_2O_2$ Final % | Final $As^{+3}$ (ppm) |
|---|---|---|---|---|---|---|---|
| 13 | Int. Prod. | 30% RG | 0.5 | 51 | 400 | <0.01 | <5 |
| 14 | Int. Prod. | 30% RG | 0.3 | 26 | 164 | <0.01 | <5 |

The above results indicate that molybdenum and phosphoric acid (monophosphate) together act as a catalyst for the process of this invention.

Examples 15-18 illustrate the amount of hydrogen peroxide oxidizing agent required for satisfactory operation of the process of this invention.

EXAMPLE 15

In this example, an effort was made to remove arsenic impurity from industrial grade AHF by using a very small quantity of 50% commercial grade $H_2O_2$, ammonium molybdate and sodium pyrophosphate as a catalyst in the equipment described above. The industrial grade AHF initially contained arsenic impurity in the range of 500-800 ppm $As^{+3}$. The reactor was charged with 400 gm of AHF, 0.8 ml of 50% commercial grade $H_2O_2$, 14.7 mg of ammonium molybdate, and 20.5 mg of sodium pyrophosphate.

The reactants were allowed to react at about 57° C. for 55 minutes. At the end of the reaction, $H_2O_2$ was completely decomposed. The final reaction mixture after the reaction contained less than 5 ppm $As^{+3}$. The results are given in Table 5 below. SP stands for Sodium Pyrophosphate.

EXAMPLE 16

In this example, an effort was made to remove arsenic impurity from an intermediate product by using small quantities of 50% commercial grade hydrogen peroxide (i.e, containing a phosphate stabilizer) and ammonium molybdate as a catalyst in the equipment described above. The intermediate product initially contained arsenic impurity in the range of 500-800 ppm $As^{+3}$. The reactor was charged with 403 grams of an intermediate product, 2.0 ml of 50% commercial grade hydrogen peroxide and 7.5 mg of ammonium molybdate. The reactants were allowed to react at about 57° C. for a period of 30 minutes. At the end of the reaction, hydrogen peroxide was completely decomposed. The final reaction mixture after the reaction contained less than 5 ppm of $As^{+3}$. These results are given in Table 5 below.

EXAMPLE 17

In this example, the effort was made to remove arsenic impurity from an intermediate product by using medium quantities of 50% commercial grade hydrogen peroxide (i.e., containing a phosphate stabilizer) and ammonium molybdate as a catalyst in the equipment described above. The intermediate product initially contained arsenic impurity in the range of 500-800 ppm $As^{+3}$. The reactor was charged with 402 grams of intermediate product, 4.0 ml of 50% commercial hydrogen peroxide, and 14.8 mg of ammonium molybdate. The reactants were allowed to react at about 57° C. for a period of 30 minutes. At the end of the reaction, hydrogen peroxide was completely decomposed. The final reaction mixture after the reaction contained less than 5 ppm $As^{+3}$. The results are given in Table 5 below.

EXAMPLE 18

In this example, the effort was made to remove arsenic impurity from an intermediate product by using large quantities of 50% commercial grade hydrogen peroxide (i.e., containing a phosphate stabilizer) and ammonium molybdate as a catalyst in the equipment described above. The intermediate product initially contained arsenic impurity in the range of 500-800 ppm $As^{+3}$. The reactor was charged with 400 grams of intermediate product, 9.0 ml of 50% commercial grade hydrogen peroxide, and 36.8 mg of ammonium molybdate. The reactants were allowed to react at about 57° C. for a period of 30 minutes. At the end of the reaction, hydrogen peroxide was completely decomposed. The final reaction mixture after the reaction contained less than 5 ppm of $As^{+3}$. The results are given in Table 5 below.

TABLE 5

| Ex. No. | HF Source | $H_2O_2$ Type | Catalyst $H_2O_2$ Initial % | Mo (ppm) | SP (ppm) | $H_2O_2$ Final % | Final $As^{+3}$ (ppm) |
|---|---|---|---|---|---|---|---|
| 15 | Ind. AHF | 50% CG | 0.1 | 37 | 51 | <0.01 | <5 |
| 16 | Int. Prod. | 50% CG | 0.25 | 18 | 0 | <0.01 | <5 |
| 17 | Int. Prod. | 50% CG | 0.5 | 37 | 0 | <0.01 | <5 |
| 18 | Int. | 50% | 1.1 | 92 | 0 | <0.01 | <5 |

TABLE 5-continued

| Ex. No. | HF Source | H$_2$O$_2$ Type | Catalyst | | | | Final As$^{+3}$ (ppm) |
|---|---|---|---|---|---|---|---|
| | | | H$_2$O$_2$ Initial % | Mo (ppm) | SP (ppm) | H$_2$O$_2$ Final % | |
| | Prod. | CG | | | | | |

The above results indicate that the amount of hydrogen peroxide which can be used in the process of this invention can range from 0.1% to 1.1% by weight of hydrogen peroxide. The lower limit corresponds to about 3 times the stoichiometric amount. The most preferred amount of hydrogen peroxide to be used in the process of this invention ranges from 0.25% to 0.5% by weight of hydrogen peroxide. It is projected that the process of this invention works satisfactorily for hydrogen peroxide greater than 1.1%. The upper limit of hydrogen peroxide that can be used in the process of this invention is limited only by economics and convenience.

Examples 19-22 illustrate that the process of the present invention is not limited for use of any one type or source of hydrogen peroxide. The catalysts required for the process of this invention can be added separately or through stabilizers already present in commercial hydrogen peroxide.

EXAMPLE 19

This example was conducted to remove arsenic impurity from an intermediate product by using 70% dilution grade hydrogen peroxide and ammonium molybdate and sodium pyrophosphate as a catalyst in the equipment described above. The intermediate product initially contained arsenic impurity in the range of 500-800 ppm As$^{+3}$. The reactor was charged with 402 grams of intermediate product. 2.8 ml of 70% dilution grade hydrogen peroxide, 7.4 mg of ammonium molybdate, and 10.2 mg of sodium pyrophosphate. The reactants were allowed to react at about 57° C. for a period of 45 minutes. At the end of the reaction, hydrogen peroxide was completely decomposed. The final reaction mixture after the reaction contained less than 5 ppm of arsenic. The results are given in Table 6 below. Sp stands for Sodium Pyrophosphate.

EXAMPLE 20

This example was conducted to remove arsenic impurity from an intermediate product by using 70% technical grade hydrogen peroxide and ammonium molybdate and sodium pyrophosphate as catalysts in the equipment described above. The intermediate product initially contained arsenic impurity in the range of 500-800 ppm As$^{+3}$. The reactor was charged with 400 grams of intermediate product, 2.8 ml of 70% technical grade hydrogen peroxide, 7.4 mg of ammonium molybdate and 10.2 mg of sodium pyrophosphate. The reactants were allowed to react a about 57° C. for a period of 50 minutes. At the end of the reaction, hydrogen peroxide was completely decomposed. The final reaction mixture after the reaction contained less than 5 ppm of arsenic. The results are given in Table 6 below.

EXAMPLE 21

This example was conducted to remove arsenic impurity from an intermediate product by using 50reagent grade hydrogen peroxide and ammonium molybdate and sodium pyrophosphate as catalysts in the equipment described above. The intermediate product initially contained arsenic impurity in the range of 500-800 ppm As$^{+3}$. The reactor was charged with 410 grams of intermediate product, 4.1 ml of 50% reagent grade hydrogen peroxide, and 7.5 mg of ammonium molybdate and 10.5 mg of sodium pyrophosphate. The reactants were allowed to react at about 57° C. for a period of 45 minutes. At the end of the reaction, hydrogen peroxide was completely decomposed. The final reaction mixture after the reaction contained less than 5 ppm of arsenic. The results are given in Table 6 below.

EXAMPLE 22

This example was conducted to remove arsenic impurity from an intermediate product by using 50% commercial grade hydrogen peroxide and ammonium molybdate as a catalyst in the equipment described above. The intermediate product initially contained arsenic impurity in the range of 500-800 ppm As$^{+3}$. The reactor was charged with 406 grams of intermediate product 2.6 ml of 50% commercial grade hydrogen peroxide, and 7.5 mg of ammonium molybdate. The reactants were allowed to react at about 57° C. for a period of 15 minutes. At the end of the reaction hydrogen peroxide was completely decomposed. The final reaction mixture after the reaction contained less than 5 ppm of arsenic. The results are given in Table 6 below.

TABLE 6

| Ex. No. | HF Source | H$_2$O$_2$ Type | Catalyst | | | | Final As$^{+3}$ (ppm) |
|---|---|---|---|---|---|---|---|
| | | | H$_2$O$_2$ Initial % | Mo (ppm) | SP (ppm) | H$_2$O$_2$ Final % | |
| 19 | Int. Prod. | 70% DG | 0.5 | 18 | 26 | <0.01 | <5 |
| 20 | Int. Prod. | 70% TG | 0.5 | 18 | 26 | <0.01 | <5 |
| 21 | Int. Prod. | 50% RG | 0.5 | 18 | 26 | <0.01 | <5 |
| 22 | Int. Prod. | 50% CG | 0.3 | 18 | 0 | <0.01 | <5 |

The results of the above table indicate that the process of the present invention works satisfactorily with all types of hydrogen peroxide tested.

The following examples illustrate the preferred temperature for satisfactory operation of the process of the present invention.

EXAMPLE 23

In this example, an effort was made to remove arsenic impurity from an intermediate product at low temperature by using 50% commercial $H_2O_2$ (i.e., containing a phosphate stabilizer) and ammonium molybdate as catalyst in equipment described above. The intermediate product initially contained arsenic impurity in the range of 500–800 ppm $As^{+3}$. The reactor was charged with 400 gms of intermediate product, 4.2 ml of 50% commercial $H_2O_2$, and 36.8 mg of ammonium molybdate catalyst. The reactants were allowed to react at about 2° C. for a period of 35 minutes. At the end of the reaction, $H_2O_2$ was not completely decomposed. The final reaction after the reaction contained 580 ppm of $As^{+3}$. The results are given in Table 7 below.

EXAMPLE 26

In this example, attempt was made to remove arsenic impurity from an intermediate product at high temperature by using 50% commercial grade $H_2O_2$ (containing a phosphate stabilizer) and ammonium molybdate as catalyst in laboratory equipment described above. The intermediate product initially contained arsenic impurity in the range of 500–800 ppm $As^{+3}$. The reactor was charged with 402 gm of intermediate product, 4.0 ml of 50% commercial grade $H_2O_2$, and 14.8 mg of ammonium molybdate. The reactants were allowed to react at about 57° C. for a period of 30 minutes. H was completely decomposed at the end of the reaction The reaction mixture at the end of the reaction contained less than 5 ppm $As^{+3}$. The results are given in Table 7 below.

TABLE 7

| Ex. No. | HF Source | $H_2O_2$ Type | Catalyst $H_2O_2$ Initial % | Mo (ppm) | SP (ppm) | $H_2O_2$ Final % | Final $As^{+3}$ (ppm) |
| --- | --- | --- | --- | --- | --- | --- | --- |
| 23 | Int. Prod. | 50% CG | 0.5 | 92 | 0 | 0.49 | 580 |
| 24 | Ind. AHF | 50% CG | 0.5 | 37 | 51 | <0.01 | <5 |
| 25 | Ind. AHF | 50% CG | 0.5 | 37 | 51 | <0.01 | <5 |
| 26 | Int. Prod. | 50% CG | 0.5 | 37 | 0 | <0.01 | <5 |

EXAMPLE 24

In this example, an effort was made to remove arsenic impurity from industrial grade AHF at moderately low temperature by using 50% commercial $H_2O_2$ (i.e., containing a phosphate stabilizer) and ammonium molybdate and sodium pyrophosphate as catalyst in equipment described above. The industrial grade AHF initially contained arsenic impurity in the range of 500–800 ppm $As^{+3}$. The reactor was charged with 400 gm of industrial grade AHF, 4.0 ml of 50% reagent grade $H_2O_2$, 14.7 mg of ammonium molybdate, and 20.5 mg of sodium pyrophosphate as catalyst in equipment described above. The reactants were allowed to react at about 15° C. for a period of 45 minutes At the end of the reaction, $H_2O_2$ was completely decomposed. The reaction mixture at the end of the reaction contained less than 5 ppm of $As^{+3}$. The results are given in Table 7 below. SP stands for Sodium Pyrophosphate.

EXAMPLE 25

In this example, an attempt was made to remove arsenic impurity from industrial grade AHF at moderately high temperature by using 50% commercial grade $H_2O_2$ (i.e., containing a phosphate stabilizer) and ammonium molybdate and sodium pyrophosphate as catalyst in equipment described above. The industrial grade AHF initially contained arsenic impurity in the range of 500–800 ppm $As^{+3}$. The reactor was charged with 400 gm of AHF, 4.0 ml of 50% commercial grade $H_2O_2$, 14.7 mg of ammonium molybdate and 20.5 mg of sodium pyrophosphate catalyst. The reactants were allowed to react at about 35° C. for a period of 45 minutes $H_2O_2$ was completely decomposed at the end of the reaction. The reaction mixture at the end of the reaction contained less than 5 ppm of $As^{+3}$. The results are given in Table 7 below.

The above results indicate that arsenic is not removed at about 2° C. and arsenic can easily be removed at any temperature in the range of about 15°–57° C. The preferred temperature range for the process of this invention is about 50°–60° C. It is projected that arsenic could easily be removed at any temperature greater than about 57° C. although it requires unnecessarily higher operating pressures. A broad operating temperature range is estimated to be from about 15°–75° C.

Examples 27, 28, and 29 illustrate the residence time required in the preferred operation of the process of this invention.

EXAMPLE 27

This example was conducted to remove arsenic impurity from industrial grade AHF at very low residence time by using 50% commercial grade $H_2O_2$ and ammonium molybdate and sodium pyrophosphate catalyst in the equipment described above The industrial grade AHF initially contained arsenic impurity in the range of 500–800 ppm $As^{+3}$. The reactor was charged with 400 gm of AHF, 4.0 ml of 50% commercial grade $H_2O_2$, 14.7 mg ammonium molybdate and 20.5 mg of sodium pyrophosphate. The reactants were allowed to react at about 57° C. for a period of 3 minutes. At the end of the reaction, the $H_2O_2$ was completely decomposed. The reaction mixture obtained after the reaction contained less than 5 ppm of $As^{+3}$. The results are given in Table 8 below. SP stands for Sodium Pyrophosphate.

EXAMPLE 28

This example was conducted to remove arsenic impurity from an intermediate product by using 50% commercial grade hydrogen peroxide (i.e., containing a phosphate stabilizer) and ammonium molybdate as a catalyst at low residence times in the equipment described above. The intermediate product initially contained arsenic impurity in the range of 500–800 ppm $As^{+3}$. The reactor was charged with 406 grams of intermediate product, 2.6 ml of 50% commercial grade hydrogen peroxide, and 7.5 mg of ammonium molybdate. The reactants were allowed to react at about 57° C. for a period of 15 minutes. At the end of the reaction, the hydrogen peroxide was completely decomposed. The reaction mixture after the reaction contained less than 5 ppm of $As^{+3}$. The results are given in Table 8 below.

EXAMPLE 29

This example was conducted to remove arsenic impurity from an intermediate product by using 50% commercial hydrogen peroxide (i.e., containing a phosphate stabilizer) and ammonium molybdate as catalyst at longer residence time in the equipment described above. The intermediate product initially contained arsenic impurity in the range of 500–800 ppm $As^{+3}$. The reactor was charged with 406 grams of intermediate product, 9.2 ml of 50% commercial hydrogen peroxide, and 37.4 mg of ammonium molybdate. The reactants were allowed to react at about 57° C. for a period of 45 minutes. At the end of the reaction, the hydrogen peroxide was completely decomposed. The reaction mixture after the reaction contained less than 5 ppm of arsenic impurity. The results are given in Table 8 below.

TABLE 8

| Ex. No. | HF Source | $H_2O_2$ Type | Catalyst $H_2O_2$ Initial % | Mo (ppm) | SP (ppm) | $H_2O_2$ Final % | Final $As^{+3}$ (ppm) |
|---|---|---|---|---|---|---|---|
| 27 | Ind. AHF | 50% CG | 0.5 | 37 | 51 | <0.01 | <5 |
| 28 | Int. Prod. | 50% CG | 0.3 | 18 | 0 | <0.01 | <5 |
| 29 | Int. Prod. | 50% CG | 1.1 | 92 | 0 | <0.01 | <5 |

The results above indicate that 3 minutes are sufficient for satisfactory operation of the process of the present invention. The results also indicate that satisfactory operation is obtained with reaction times of 15 and 45 minutes. It is projected that satisfactory operation could be obtained at reaction times less than 3 minutes and greater than 45 minutes although it is not economical to use higher residence time in the process of the present invention. The advantage gained by reducing the reaction time to less than 3 minutes is not great. The preferred reaction time for satisfactory operation of the process of this invention is 30–45 minutes Examples 30, 31, 32, 33, and 34 illustrate the amount of catalyst required for satisfactory operation of the process of the present invention.

EXAMPLE 30

In this example, the effort was made to remove arsenic impurity from industrial grade AHF at low levels of ammonium molybdate catalyst using 50% commercial grade $H_2O_2$ and ammonium molybdate and sodium pyrophosphate catalyst in equipment described above. The industrial grade AHF initially contained arsenic impurity in the range of 500–800 ppm $As^{+3}$. The reactor was charged with 400 gm of AHF, 4 ml of 50% commercial grade $H_2O_2$, 1.5 mg ammonium molybdate, and 10.2 mg of sodium pyrophosphate. The reactants were allowed to react at about 57° C. for a period for 30 minutes. At the end of the reaction $H_2O_2$ was completely decomposed. The reaction mixture at the end of the reaction contained less than 5 ppm $As^{+3}$. The results are given in Table 9 below.

EXAMPLE 31

In this example, the removal of arsenic impurity from an intermediate product was effected by using 70% technical grade hydrogen peroxide and low quantities of ammonium molybdate and sodium pyrophosphate catalysts in the equipment described above. The intermediate product initially contained arsenic impurity in the range of 500–800 ppm $As^{+3}$. The reactor was charged with 400 grams of intermediate product 2.9 ml of 70% technical grade peroxide, 7.4 mg of ammonium molybdate, and 10.1 mg of sodium pyrophosphate. The reactants were allowed to react at about 57° C. for a period of 50 minutes. At the end of the reaction, the hydrogen peroxide was completely decomposed. The final reaction mixture obtained after the reaction contained less than 5 ppm of $As^{+3}$. The results are given in Table 9 below.

EXAMPLE 32

In this example, the effort was made to remove arsenic impurity from an intermediate product by using 50% commercial grade hydrogen peroxide and ammonium molybdate as catalyst in the equipment described above. In this case, sodium pyrophosphate catalyst is supplied from commercial grade hydrogen peroxide. The intermediate product initially contained arsenic impurity in the range of 500–800 ppm $As^{+3}$. The reactor was charged with 403 grams of intermediate product, 2.0 ml of 50% commercial grade hydrogen peroxide and 7.4 mg of ammonium molybdate catalyst. The reactants were allowed to react at about 57° C. for a period of 30 minutes. At the end of the reaction, the hydrogen peroxide was completely decomposed. The final reaction mixture obtained after the reaction contained less than 5 ppm $As^{+3}$. The results are given in Table 9 below. In Table 9, * means the estimated value from phosphate stabilizer in commercial grade hydrogen peroxide.

EXAMPLE 33

In this example, the effort was made to remove arsenic impurity from an intermediate product by using 30% reagent grade hydrogen peroxide and medium quantities of ammonium molybdate and sodium pyrophosphate as catalysts. The intermediate product initially contained arsenic impurity in the range of 500–800 ppm $As^{+3}$. The reactor was charged with 450 grams of intermediate product, 7.5 ml of 30% reagent grade hydrogen peroxide, 16.6 mg of ammonium molybdate, and 23.0 mg of sodium pyrophosphate catalyst. The reactants were allowed to react at about 57° C. for a period of 45 minutes. At the end of the reaction the hydrogen peroxide was completely decomposed. The reaction mixture obtained after reaction contained less than 5 ppm of $As^{+3}$. The results are given in Table 9 below.

EXAMPLE 34

In this example, the effort was made to remove arsenic impurity from an intermediate product by using 50% commercial grade hydrogen peroxide (i.e., containing a phosphate stabilizer) and a large quantity of ammonium molybdate catalyst The intermediate product initially contained arsenic impurity in the range of 500–800 ppm $As^{+3}$. The reactor was charged with 399 grams of intermediate product, 9.3 ml 50% commercial grade hydrogen peroxide, and 257 mg of ammonium molybdate as catalyst. The reactants were allowed to react at about 57° C. for a period of 45 minutes. At the end of the reaction, hydrogen peroxide was completely decomposed. The reaction mixture obtained after the reaction contained less than 5 ppm $As^{+3}$. The results are given in Table 9 below.

TABLE 9

| Ex. No. | HF Source | $H_2O_2$ Type | Catalyst $H_2O_2$ Initial % | Catalyst Mo (ppm) | Catalyst SP (ppm) | Catalyst $H_2O_2$ Final % | Final $As^{+3}$ (ppm) |
|---|---|---|---|---|---|---|---|
| 30 | Ind. AHF | 50% CG | 0.5 | 3.7 | 26 | <0.01 | <5 |
| 31 | Int. Prod. | 70% TG | 0.5 | 18 | 26 | <0.01 | <5 |
| 32 | Int. Prod. | 50% CG | 0.25 | 18 | 3.5* | <0.01 | <5 |
| 33 | Int. Prod. | 50% RG | 0.5 | 37 | 51 | <0.01 | <5 |
| 34 | Int. Prod. | 50% CG | 1.2 | 645 | 16.4* | <0.01 | <5 |

The results in Table 9 indicate that the quantity of ammonium molybdate catalyst varies from 3.7–645 ppm for satisfactory operation of the process of this invention. These results also indicate that the quantity of sodium pyrophosphate catalyst varies from 3.5 to 51 ppm for satisfactory operation of the process of this invention. The preferred quantity of catalysts required for satisfactory operation of the process of this invention are 15–40 ppm of ammonium molybdate and 25–50 ppm of sodium pyrophosphate.

EXAMPLE 35

In this example, an attempt was made to remove arsenic impurity from an intermediate product contaminated with a lubricating grease by using 30% reagent grade hydrogen peroxide and ammonium molybdate and sodium pyrophosphate as a catalyst in the laboratory reactor described above The intermediate product initially contained arsenic impurity in the range of 500–900 ppm $As^{+3}$. The reactor was charged with 400 grams of intermediate product 40.0 mg of lubricating grease 6.7 ml of 30% reagent grade hydrogen peroxide, 14.7 mg of ammonium molybdate and 20.5 mg sodium pyrophosphate. The reactants were allowed to react at about 57° C. for a period of 45 minutes Hydrogen peroxide was not decomposed at the end of the reaction. The final reaction mixture after the reaction contained 530 ppm $As^{+3}$. The results are given in Table 10 below.

EXAMPLE 36

In this example, an attempt was made to remove arsenic impurity from an intermediate product contaminated with a lubricating grease by using 30% reagent grade hydrogen peroxide and ammonium molybdate and sodium pyrophosphate as a catalyst and nitrate from nitric acid as an oxidizing agent for grease in the laboratory reactor described above. The intermediate product initially contained arsenic impurity in the range of 500–900 ppm $AS^{+3}$. The reactor was charged with 400 grams of intermediate product 40.0 mg of lubricating grease 6.7 ml of 30% reagent grade hydrogen peroxide, 14.7 mg of ammonium molybdate, 20.5 mg of sodium pyrophosphate, and 3.4 mg of nitric acid. The reactants were allowed to react at about 57° C. for a period of 30 minutes. Hydrogen peroxide was completely decomposed at the end of the reaction. The final reaction mixture after the reaction contained 10 ppm $As^{+3}$. The results are given in Table 10 below.

EXAMPLE 37

In this example, an attempt was made to remove arsenic impurity from an intermediate product contaminated with a lubricating grease by using 50% commercial grade hydrogen peroxide and ammonium molybdate and sodium pyrophosphate as a catalyst and nitrate from sodium nitrate as oxidizing agent for grease in the laboratory reactor described above. The intermediate product initially contained arsenic impurity in the range of 500–900 ppm $As^{+3}$. The reactor was charged with 400 grams of an intermediate product, 100 mg of a lubricating grease, 4.0 ml 50% commercial grade hydrogen peroxide, 14.7 mg of ammonium molybdate, 20.5 mg of sodium pyrophosphate, and 2.2 mg of sodium nitrate. The reactants were allowed to react at about 57° C. for a period of 30 minutes. Hydrogen peroxide was completely decomposed at the end of the reaction. The final reaction mixture after the reaction contained 9 ppm $As^{+3}$. The results are given in Table 10 below.

TABLE 10

| Ex. No. | HF Source | $H_2O_2$ Type | $H_2O_2$ Initial % | Added Grease (ppm) | Catalyst Mo (ppm) | Catalyst SP (ppm) | Nit Comp (ppm) | % $H_2O_2$ Final | Final $As^{+3}$ (ppm) |
|---|---|---|---|---|---|---|---|---|---|
| 35 | Int. Prod | 30% RG | 0.5 | 100 | 37 | 51 | 0 | 0.5 | 530 |
| 36 | Int. Prod. | 30% RG | 0.5 | 100 | 37 | 51 | 8.5 $HNO_3$ | <0.01 | 10 |
| 37 | Int. Prod. | 50% CG | 0.5 | 250 | 37 | 51 | 5.5 $NaNO_3$ | <0.01 | 9 |

EXAMPLES 38–47

For Examples 38–47, an attempt was made to remove arsenic impurity from an intermediate product by using hydrogen peroxide and the catalyst system indicated in Table 11 below. The intermediate product was obtained during the process of manufacturing industrial grade anhydrous hydrogen fluoride. The intermediate product was anhydrous hydrogen fluoride obtained from the reboiler outlet of the first distillation column in a two column purification system for industrial grade anhydrous hydrogen fluoride. Standard analytical methods were employed for hydrogen peroxide and arsenic analyses. Hydrogen peroxide analyses were made by standardized thiosulfate titration of liberated iodine. Arsenic analyses were made by absorption of arsine by silver diethyldithiocarbamate in pyridine and spectrophotometric comparison to a standard.

The equipment used in the laboratory studies consisted of a cylindrical mild steel Teflon(registered trademark) coated reactor of about 800 cc. capacity. The reactor was jacketed for circulation of hot and cold water for temperature control.

The initial value of arsenic impurity in the intermediate product before the reaction was in the range of 1000–1500 ppm of arsenic as As metal. For the hydrogen peroxide, a 50% commercial grade $H_2O_2$ was used. The laboratory reactor described above was charged with about 200 grams intermediate prOduct, hydrogen peroxide, the type and amount of metal indicated in Table 11, and the type and amount of phosphate (abbreviated as P) component indicated in Table 11: the components reacted at a reaction temperature of about 55 to 62° C. at a pressure of about 36–62 psig for about 60 minutes. SP stands for sodium pyrophosphate.

Examples 38 and 39 were run with an inorganic molybdenum compound as the metal component. Example 40 was run with an organic molybdenum compound which was molybdenum acetyl acetonate and abbreviated as MAA in Table 11. Example 41 was run with vanadium metal. Example 42 was run with an organic vanadium compound which was vanadyl acetate and abbreviated as VA in Table 11. Examples 43–47 were run with inorganic vanadium compounds.

In general after completion of laboratory experiments, we did not distill the final reacted reaction mixture to obtain high purity anhydrous hydrogen fluoride. However, in actual commercial practice, the reaction mixture will be distilled to obtain high purity anhydrous hydrogen fluoride product. Instead of analyzing the distilled high purity anhydrous hydrogen fluoride product for $As^{+3}$, we analyzed the final reacted reaction mixture for $As^{+3}$. We have found that $As^{+3}$ that would be present in distilled high purity anhydrous hydrogen fluoride is less than or equal to $As^{+3}$ present in the final reacted reaction mixture. The final % of $H_2O_2$ indicated in Table 11 shows that the catalyst system does decompose the $H_2O_2$.

TABLE 11

| Ex. No. | % $H_2O_2$ Initial | Catalyst Metal | Catalyst P | % $H_2O_2$ Final | Final $As^{+3}$ (ppm) |
|---|---|---|---|---|---|
| 38 | 0.49 | 12 $MoO_3H_3PO_4$ 49 ppm Mo | SP 49 ppm $P_2O_7$ | 0.008 | <5 |
| 39 | 0.48 | 12 $MoO_3H_4SiO_4$ 48 ppm Mo | SP 48 ppm $P_2O_7$ | 0.014 | <5 |
| 40 | 0.53 | MAA 53 ppm Mo | SP 53 ppm $P_2O_7$ | 0.008 | <5 |
| 41 | 0.47 | Vanadium metal 473 ppm V | 120 ppm SP 47 ppm $P_2O_7$ | 0.015 | <5 |
| 42 | 0.49 | 185 ppm VA 49 ppm V | 126 ppm SP 49 ppm $P_2O_7$ | 0 | <5 |
| 43 | 0.48 | 86 ppm $NH_4VO_3$ 33 ppm V | 120 ppm SP 47 ppm $P_2O_7$ | 0.001 | <5 |
| 44 | 0.47 | 151 ppm $NH_4VO_3$ 58 ppm V | 120 ppm SP 47 ppm $P_2O_7$ | 0.004 | <5 |
| 45 | 0.46 | 168 ppm $NaVO_3$ 62 ppm V | 120 ppm SP 47 ppm $P_2O_7$ | 0.007 | <5 |
| 46 | 0.49 | 177 ppm $Na_3VO_4$ 49 ppm V | 126 ppm SP 49 ppm $P_2O_7$ | 0.007 | <5 |
| 47 | 0.53 | 220 ppm $Na_3VO_4$ 61 ppm V | 136 ppm SP 53 ppm $P_2O_7$ | 0.007 | <5 |

It is to be understood that various modifications may be made in the details presented without departing from the spirit and scope of the invention as defined in the appended claims.

We claim:

1. A process for manufacturing anhydrous hydrogen fluoride with reduced levels of arsenic impurity from arsenic contaminated anhydrous hydrogen fluoride which comprises the steps of:
   (a) contacting said anhydrous hydrogen fluoride with an effective amount of hydrogen peroxide to oxidize the arsenic impurity in the presence of a catalyst which comprises a catalytic amount of
      (i) a component selected from the group consisting of an organic molybdenum compound, vanadium, and a vanadium compound and,
      (ii) a phosphate compound, at a temperature and for a period of time sufficient to oxidize volatile trivalent arsenic impurities in the anhydrous hydrogen fluoride to non-volatile pentavalent arsenic compounds, and
   (b) distilling the resulting mixture and recovering anhydrous hydrogen fluoride with reduced levels of arsenic impurity.

2. The process of claim 1 in which the arsenic contaminated hydrogen fluoride is free of an amount of organic contaminants which would interfere with the hydrogen peroxide oxidation of said arsenic impurities.

3. The process of claim 2 wherein more than the stoichiometric amount of hydrogen peroxide is used which is required for oxidation of said trivalent arsenic impurities to said pentavalent arsenic compounds.

4. The process of claim 3 wherein the anhydrous hydrogen fluoride starting material has a purity of 99.95% HF or better.

5. The process of claim 3 wherein the hydrogen peroxide is 50% to 70% by weight commercial grade hydrogen peroxide.

6. The process of claim 1 wherein said component (i) is an organic molybdenum compound.

7. The process of claim 1 wherein said component (i) is vanadium.

8. The process of claim 1 wherein said component (i) is an organic vanadium compound.

9. The process of claim 1 wherein said component (i) is an inorganic vanadium compound.

10. The process of claim 1 wherein said component (i) is ammonium vanadate.

11. The process of claim 1 wherein said component (i) is sodium vanadate.

12. The process of claim 3 wherein the amount of hydrogen peroxide used is at least 3 times the stoichiometric amount.

13. The process of claim 3 wherein the reaction is carried out at a temperature in the range of about 15° to about 75° C.

14. The process of claim 3 wherein the amount of the metal component in the catalyst is at least about 3.7 ppm based on 100% HF and the amount of the phosphate component in the catalyst is at least about 3.5 ppm based on 100% HF.

15. The process of claim 3 wherein the amount of said metallic compound in the catalyst is about 10 to about 65 ppm based on 100% HF.

16. A process for manufacturing anhydrous hydrogen fluoride with reduced levels of arsenic impurity from arsenic and organic material contaminated anhydrous hydrogen fluoride which comprises the steps of:

(A) contacting said anhydrous hydrogen fluoride with:
  (1) an effective amount of hydrogen peroxide to oxidize the arsenic impurity, in the presence of a catalyst which comprises a catalytic amount of:
    (a) a component selected from the group consisting of an organic molybdenum compound, vanadium, and a vanadium compound, and
    (b) a phosphate compound, and
  (2) an effective amount of an oxidizing agent to oxidize the organic material present, at a temperature and for a period of time sufficient to oxidize volatile trivalent arsenic impurities in the anhydrous hydrogen fluoride to non-volatile pentavalent arsenic compounds, and
(B) distilling the resulting mixture and recovering anhydrous hydrogen fluoride with reduced levels of arsenic impurity.

17. The process of claim 16 wherein the oxidizing agent is nitric acid or a salt thereof.

18. The process of claim 16 wherein the oxidizing agent is nitric acid.

19. The process of claim 16 wherein the oxidizing agent is a salt of nitric acid.

20. The process of claim 16 wherein the oxidizing agent is sodium nitrate.

* * * * *